United States Patent

[11] 3,622,566

[72] Inventors George Huck;
Siegfried Paulsen, both of Dortmund-Eving, Germany
[21] Appl. No. 803,646
[22] Filed Mar. 3, 1969
[45] Patented Nov. 23, 1971
[73] Assignee Bergwerksverband G.m.b.H.
Essen, Germany
[32] Priority Mar. 7, 1959
[33] Germany
[31] B 53352
Continuation of application Ser. No. 843,579, Sept. 30, 1959, now abandoned. This application Mar. 3, 1969, Ser. No. 803,646

[54] METHOD FOR PREPARING DIAZA-CYLOPROPANES
7 Claims, 1 Drawing Fig.
[52] U.S. Cl. .................................................. 260/239 AA
[51] Int. Cl. .......................................................... C07d 45/00
[50] Field of Search ............................................ 260/239 AA

[56] References Cited
FOREIGN PATENTS
1,123,330 2/1962 Germany ..................... 260/239

Primary Examiner—Alton D. Rollins
Attorney—Waters, Roditi, Schwartz and Nissen

ABSTRACT: A process for the production of compounds of the formula:

wherein R' is hydrogen or an alkyl group of one-five carbon atoms and R'' is an alkyl group of one-five carbon atoms or phenyl; and R' and R'' when taken together with the carbon atoms of the diazapropane form cyclohexyl, said process comprising reacting chlorine and an excess of ammonia, the ammonia being present in a volume ratio of between 1:4 and 1:50, with a liquid carbonyl compound of the formula wherein R' and R'' are as defined above.

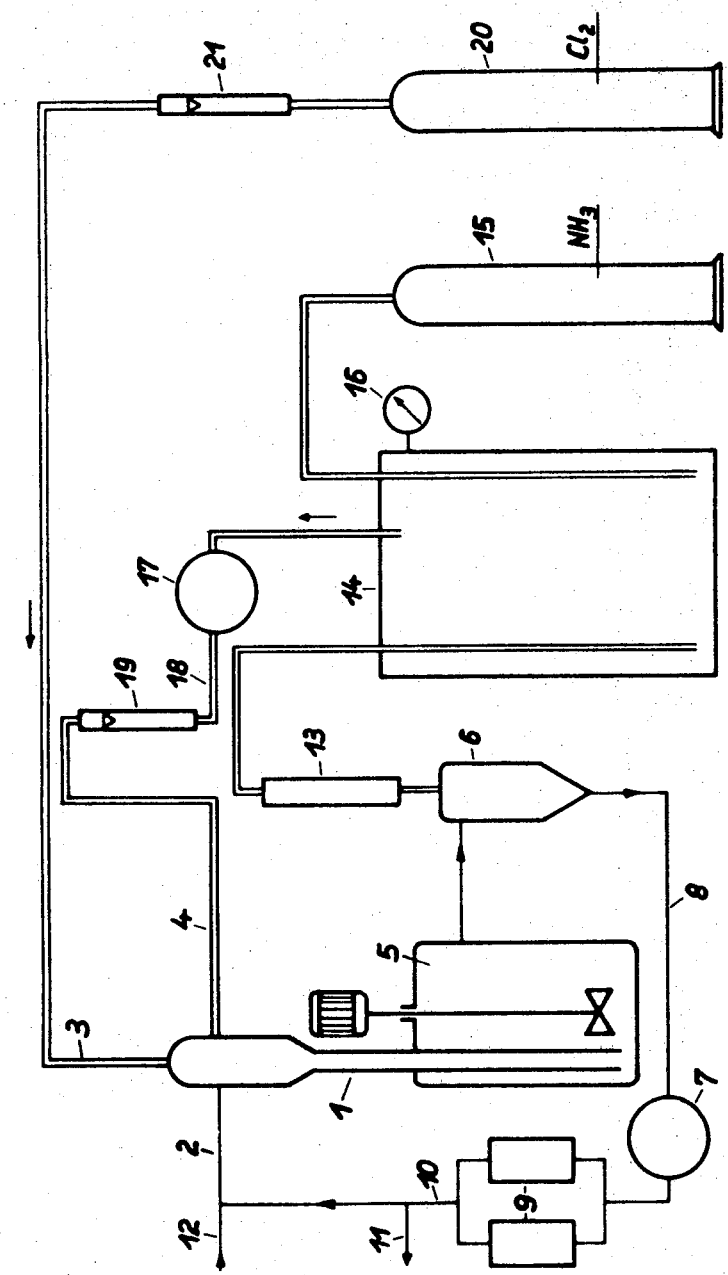

METHOD FOR PREPARING DIAZA-CYLOPROPANES

OTHER APPLICATION

This is a continuation of application 843 579 filed Sept. 30, 1959, and now abandoned.

DRAWING

The sole Figure of the drawing is a diagrammatic showing illustrating the process of the invention.

DETAILED DESCRIPTION

The present invention relates to methods for producing novel organic compounds having the following structural formula:

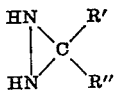

wherein R' is a member selected from the group consisting of hydrogen, alkyl radicals and cyclic substituents, and R" represents a member selected from the group consisting of alkyl radicals and cyclic substituents.

Diaza-cyclopropanes may be produced in accordance with the invention by reacting liquid compounds such as a ketone or aldehyde with chlorine and an excess of ammonia, the ammonia being present in a volume ratio between 1:4 and 1:50, preferably 1:15 at a temperature between 50° and 100° C. The formed compound can generally be isolated in pure condition by distillation.

The reaction may be described by the following equation:

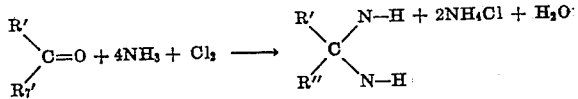

The simplest manner of manufacturing these products is to introduce the gases chlorine and ammonia into a liquid, intensively agitated ketone or aldehyde. The gases may be mixed together prior to their introduction into the ketone or aldehyde, forming a mixture consisting of chloramine and ammonia. It is thus possible to produce successfully the compounds by contacting chloramine and ammonia with ketones or aldehydes.

As mentioned above, the products may be obtained in pure condition by distillation, as well as by extraction or crystallization. In many cases, however, the amount of end product available in the presence of the remaining starting material (the carbonyl compound) is so high that a special isolation of the formed compound can be omitted when a further treatment is to take place and a subsequent conversion for the purpose of the ensuing treatment can be carried out directly within the solution. The temperature range of −50° to 100° C. is not critical. Temperatures between −20 and +20 are especially suitable. As already mentioned, the excess of ammonia over chlorine may be 50:1 parts by volume, but a ratio of 15:1 is sufficient, and a ratio of 6:1 at least should be maintained in general.

There are several possible variations in the process for producing the compounds. The reaction components may be contacted with each other in pure or diluted condition. The gases, ammonia and chlorine may be diluted with an inert gas, e.g. nitrogen.

The carbonyl compounds should be diluted with inert solvents as they will not otherwise react with the ketones, aldehydes, ammonia, chlorine and chloramine under synthetic conditions. It is advantageous to add water-insoluble solvents, such as benzene, petroleum ether, ether, etc., to carbonyl compounds in which ammonia is readily soluble, such as cyclohexanone, acetone and so forth. With higher ketones or aldehydes, such as methylisobutyl-ketone, amylethylketone or phenylmethylketone, the yields are substantially increased by adding polar solvents, such as methanol, ethanol or even water. If the solubility is too weak it is advisable to emulsify the ketones or aldehydes within the solvent.

An addition of 50 to 200 percent by weight of benzene, petroleum ether and other solvents is advantageous. When alcohols are added, small amounts such a 1-10 percent cause considerable improvements in the yields.

It is advantageous to employ an inert gas such as nitrogen to dilute the gases chlorine and ammonia. The dilution renders possible a better control of the reaction. It is therefore recommended to dilute the chlorine quite intensively, e.g. to double its volume, that is 1:1, and further to 1:10. For ammonia, a dilution of 1:2 is sufficient. On the other hand, really insignificant dilutions of 1:0.1, to 0.5 may be used.

It is obvious that it is impossible to contact any large amounts of chlorine and ammonia per unit of time with the carbonyl compound. 40 to 50 parts by weight of chlorine and a corresponding amount of ammonia per hour together with 1,000 parts by weight of the carbonyl compound are suitably united. It is scarcely possible on a technical basis to contact more than 100 parts by weight of chlorine per hour with 1,000 parts by weight of carbonyl compound. It is also not advisable to work with less than 10 parts by weight of chlorine per hour, as the production of the compounds would be too slow for practical purposes.

The reaction mixture will gradually contain an increasing amount of the formed diaza-cyclopropanes according to the added amounts of chlorine and ammonia. An optimum value exists for each starting material in respect to the percentage of product in the reaction vessel which may be at 20 percent, 30 percent or 60 percent. The continuance of the reaction beyond this favorable value does not cause an additionally essential increase of product but on the contrary, the formed diaza-cyclopropane is partly destroyed or changed by chlorination.

The average contact time is about four hours. It is possible to extend this period to 12 hours and more, if small amounts of chlorine per hour are contacted with the carbonyl compound. In general, two to three hours are sufficient. The formation of the diaza-cyclopropane in the reaction material will usually be below 10 percent after 30 minutes, so that in isolation of the desired products at that time would not be economically practical.

For the conversion, it is sufficient to introduce chlorine and ammonia into the intensively agitated carbonyl compound in a closed vessel from the top. Superatmospheric pressure causes an acceleration of the reaction course. It is therefore advantageous to bring the gases into contact with the carbonyl compound under pressure, e.g. at 2-5, or even at 20 atmospheres.

On the other hand, it is possible to pass the carbonyl compound downwardly through a scrubbing reaction tower and to counterflow chlorine and ammonia upwardly through the tower. Losses of reaction products may be largely avoided by precooling the reaction tower or providing the scrubber with cooling devices to cool the reaction mixture within the cooling tower. Instead of contacting the reaction components countercurrently, it is also possible to bring them together in direct current within a cooled tube. In such case the reaction may take place in a separate, additional reaction vessel.

The process may be carried out continuously by withdrawing continuously solution from the reaction vessel and adding fresh starting solution in a corresponding amount. In case the reaction is not sufficiently complete, the withdrawn solution can be recycled and contacted several times with the gaseous components until an optimum of percentage of reaction is achieved. The gases escaping from the reaction vessel and consisting essentially of ammonia and nitrogen may be directly used again for the reaction.

The sole FIGURE of the accompanying drawing is a diagrammatic showing which illustrates this continuous embodiment of the process which is also used in the examples III and

IV.

Referring now more particularly to the drawing, the carbonyl compound is introduced into the reaction tube 1 through the inlet tube 2, the chlorine through the tube 3 and the ammonia through the tube 4. With simultaneous formation of ammonium chloride which is downwardly rinsed by the reaction solution, all the components arrive at the stirring vessel 5 and then pass into the receiver 6 with the ammonium chloride suspended in the solution and the diaza-cychlopropane formed. The pump 7 draws off the reaction solution through pipe 8, forcing the solution through filter 9 to separate the ammonium chloride, pumping the largest part through pipe 10 or 2, respectively, back into the reaction tube 1, and a remaining part of the reaction mixture may be withdrawn through pipe 11. Fresh starting material is added through pipe 12 in accordance with the amount of solution withdrawn through pipe 11.

The excess ammonia (chlorine is always quantitatively converted) passes from the container 6 via a filter 13, which serves for the separation of entrained ammonium chloride, into the compensating- and storage-container 14, which is provided with ammonia from bottle 15, a constant pressure thus prevailing inside 14. The manometer 16 serves for the pressure control. When needed, the pump 17 withdraws a mixture consisting of ammonia and nitrogen—when starting a fixed ammonia-nitrogen-mixture is fed into the container 14—through pipe 18 which passes it through the current meter 19 and pipe 4 into the reaction tube. The chlorine is withdrawn from the bottle 20, if required, and is passed through the current meter 21 and pipe 3 to the reaction tube.

Instead of returning the reaction solution to the tube 1, it is possible to introduce this solution into a second reaction tube through line 2 and add fresh starting material into the tube 1. The reaction solution would be additionally enriched in the second reaction tube. The connection of a third reaction tube is also possible. All the reaction tubes may be supplied from the same ammonia and chlorine containers.

The novel compounds are thermally unstable and are decomposed to hydrazine sulfate by sulfuric acid with the reformation of the starting carbonyl compound. They dissociate into gaseous products at high temperatures. The decomposition temperature is influenced by the substituents R' and R'' and is substantially within the range of 50°–200° C. Due to this property these compounds are especially useful as a propellent charge when producing spongy plastics. Furthermore they can serve as an antioxidant for avoiding undesired polymerizations with synthetic materials or lacquers. They can also be employed for the stabilization of propellent charges and as antiknock agents. Their peculiar constitution further suggests interesting pharmaceutical possibilities.

Where the diaza-cyclopropane formed was not isolated by distillation in the subsequent examples, the quantitative determination took place by decomposition with sulfuric acid (addition of sulfuric acid to a sample of the reaction solution) and determination of the amount of hydrazine sulfate according to R. P. Pennemann and L. F. Audrieth (Anal. Chem. 20, 1058–61, 1949). The data of yield in percent of the theory relate always to manufactured chlorine.

The following examples are given as illustrative of the process of the present invention, the scope of the invention however not being limited to the specific details.

EXAMPLE I 85 parts by weight of ammonia and 19.3 parts by weight of chlorine are introduced per hour with vigorous agitation into a closed reaction vessel containing 600 parts by weight of butanone cooled to −5° C. The chlorine is diluted with 25 parts by weight of nitrogen. The reaction is terminated after 2 hours. 47 parts by weight of 3-methyl-3-ethyl-diaza-cyclopropane are formed. After separation of the ammonium chloride, distilling-off of unconverted butanone in vacuo at 30° C. and distillation of the residue, 32 parts of pure product are obtained. Boiling point: 32°C/17 mm. Hg; refractive index $^{20}$:1.4388; melting point: 21°–22° C; formula:

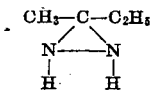

elementary analysis calculated:

C 55.77%, H 11.70%, N 32.53% found

C 54.70%, H 11.62%, N 31.66%

EXAMPLE II 4,000 parts by weight of butanone (reaction solution) are injected per hour into the top of a scrubbing reaction tower. The butanone running off is recycled into the reaction tower via a settling vessel and a pump. The whole butanone (200 parts by weight) is repumped 20 times per hour.

Ammonia is first passed through the reaction tower. As soon as the reaction tower is free from air, an ammonia overpressure of 200 mm. Hg. is adjusted inside the reaction tower which is outwardly closed. 32.7 parts by weight of chlorine are injected per hour into the lower third of the tower. By precooling the butanone, a reaction temperature of −2° C. to+4° C. is maintained. The reaction solution collected at the foot of the tower is continuously drawn off. 15.8 parts by weight of 3-methyl-3-ethyl-diaza-cyclopropane, equaling 77 percent of theory, are obtained after 30 minutes.

EXAMPLE III

In accordance with the process illustrated in the appended drawing, 900 parts by weight of pentanone-3 are added per hour, together with 83 parts by weight of ammonia and 40 parts by weight of chlorine. The ammonia is diluted with 89 parts by weight of nitrogen. The pentanone-3 is repumped 11 times per hour.

After 4 hours an enrichment of 8 percent is attained, which corresponds to the formation of 73 parts by weight of 3,3-diethyl-diaza-cyclopropane, equaling 91.2 percent of theory. 225 parts by weight of the reaction solution are now continuously withdrawn from the circulation and compensated by the addition of the same amount of weight of fresh pentanone-3.

For the purpose of reconditioning, the excess ketone is distilled off at 30° C. in vacuo from 900 parts by weight of 8 percent of the reaction solution and the residue is cooled. 61 parts by weight of 3,3-diethyl-diaza-cyclopropane crystallize out. Melting point 55°C. Elementary analysis calculated

C 59.95 H 12.07 N 27.98 found:

C 59.20 H 12.02 N 28.07

Formula: 

EXAMPLE IV

In accordance with the process illustrated in the appended drawing 700 parts by weight of methylisopropylketone are converted per hour with 93 parts by weight of ammonia together with 70 parts by weight of nitrogen and 20.85 parts by weight of chlorine. The methylisopropylketone is recycled 12 times per hour.

After 5 hours 140 parts by weight of reaction solution were hourly withdrawn from circulation and compensated by the addition of the same amount of fresh starting material.

From 700 parts by weight of withdrawn reaction solution unconverted ketone is distilled off in vacuo, the residue being subsequently cooled. 130 parts by weight of 3-methyl-3-isopropyl-diaza-cyclopropane, equaling 87.3 percent of theory, crystallize out. melting point 54° C., boiling point 67° C./50 mm. Hg.; Formula:

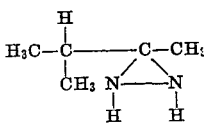

EXAMPLE V 90 parts by weight of ammonia diluted with 69 parts by weight of nitrogen and 28.3 parts by weight of chlorine are introduced per hour into a mixture consisting of 600 parts by weight of 4-methyl-pentanone-2 and 130 parts by weight of methanol. The temperature of the reaction mixture is maintained at about −5° C. After 4 hours, excess ketone and methanol are distilled off after filtering off the ammonium chloride, and subsequently the diaza-cyclopropane in vacuo. The yield amounts to 156.5 parts by weight, equaling 85.3 percent of theory, of 3-methyl-3-isobutyl-diaza-cyclopropane: boiling point 55° C./13 mm. Hg.

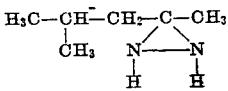

EXAMPLE VI 80 parts by weight of ammonia and 18.7 parts by weight of chlorine diluted with 38 parts by weight of nitrogen are introduced into a mixture consisting of 500 parts by weight of amylethylketone and 100 parts by weight of ethanol with agitation in the course of one hour at about +45° C.

After one hour amylketone and ethanol and finally the diaza-cyclopropane are distilled off in vacuo after filtering off the ammonium chloride. 22.2 parts by weight of 3-amyl-3-ethyl-diaza-cyclopropane are obtained.

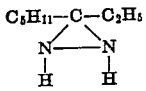

EXAMPLE VII 76 parts by weight of ammonia and 25.2 parts by weight of chlorine diluted with 95 parts by weight of nitrogen are introduced into a mixture intensively agitated consisting of 600 parts, by weight of cyclohexanone and petroleum ether (1:1) at a temperature of −5° C. Ammonium chloride is filtered off after 2 hours and the filtrate is subjected to a fractionated distillation in vacuo. 12.5 parts by weight of 1,2-diaza-spiro(2.5)-octane are obtained.

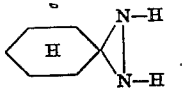

EXAMPLE VIII 35 parts by weight of ammonia, 3.5 parts by weight of chlorine and 15 parts by weight of nitrogen are introduced through a tube cooled to 0° C. into 50 parts by weight of benzaldehyde cooled to 5° and intensively agitated. 2.5 parts by weight of 3-phenyl-diaza-cyclopropane equaling 41 percent of the theory are obtained.

EXAMPLE IX 27.9 parts by weight of chlorine are introduced into 250 parts by weight of liquid ammonia at −60° C. 100 parts by weight of pentanone-3 are added to this mixture. Then the liquid ammonia is slowly distilled off. 7.65 parts by weight of 3,3-diethyl-diaza-cyclopropane equaling 19.4 percent of theory are obtained.

Without further analysis, the foregoing is believed to so fully describe the essence of the present invention that those skilled in the art can readily adapt it to various applications without omitting features which fairly constitute essential characteristics of the generic or specific aspects of this invention and, therefore, such adaptations should and are intended to be comprehended within the meaning and range of equivalence of the following claims.

We claim:
1. A process for the production of compounds of the formula:

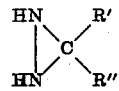

wherein R' is hydrogen or an alkyl group of 1–5 carbon atoms and R'' is an alkyl group of 1–5 carbon atoms or phenyl; and R' and R'' when taken together with the carbon atom of the diaza propane form cyclohexyl, said process comprising reacting, in the liquid phase and at a temperature between −50° and 100° C., chlorine and an excess of ammonia, the ammonia being present in a volume ratio of between 1:4 and 1:50 with a liquid carbonyl compound of the formula

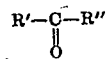

wherein R' and R'' are as defined above.

2. A process according to claim 1, in which a solvent which is inert under the reaction conditions to ammonia, chlorine and chloramine is added to the liquid carbonyl compound.

3. A process according to claim 1, in which carbonyl compounds are used which readily dissolve ammonia and are diluted with water insoluble organic solvents.

4. The process according to claim 1, in which a higher molecular weight carbonyl compound is employed together with a substance selected from the group consisting of water and water-soluble compounds.

5. A process according to claim 1 wherein reacting is effected at a temperature between −20° and 20° C.

6. A process according to claim 1 wherein reacting is effected at a pressure greater than atmospheric pressure.

8. A process according to claim 6 wherein the pressure is up to 20 atm.

* * * * *